March 15, 1955 O. WIRTH 2,704,103
METHOD OF AND APPARATUS FOR MANUFACTURING
CORELESS BANKED MULTILAYER COILS
Filed July 16, 1954 2 Sheets-Sheet 1
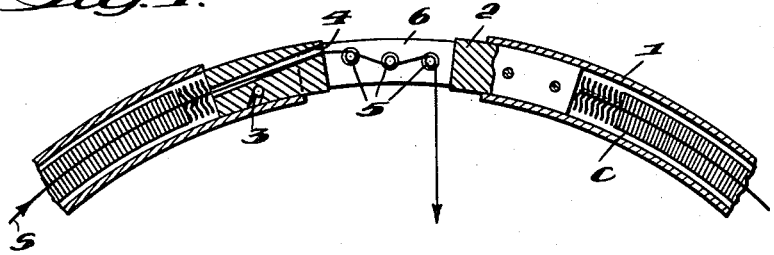
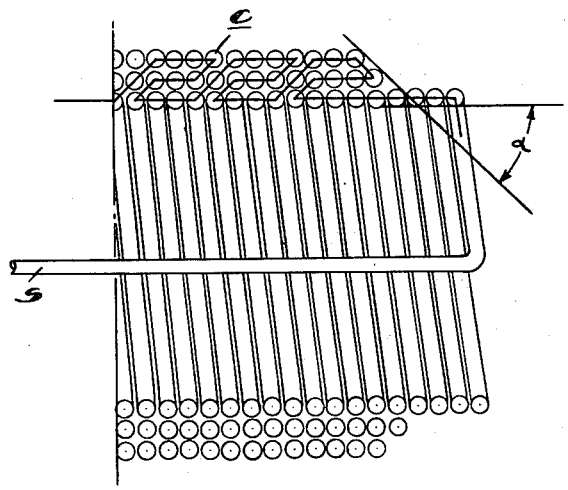
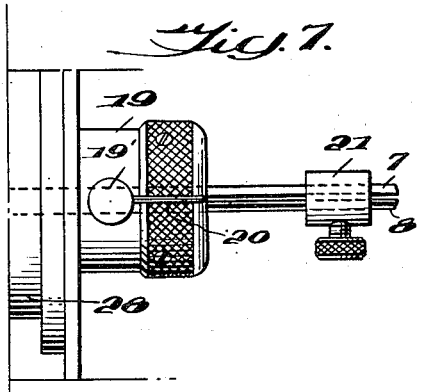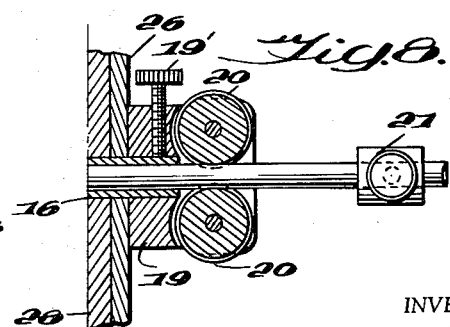
INVENTOR:
OTTO WIRTH,
BY Pierce, Scheffler & Parker,
ATTORNEYS.

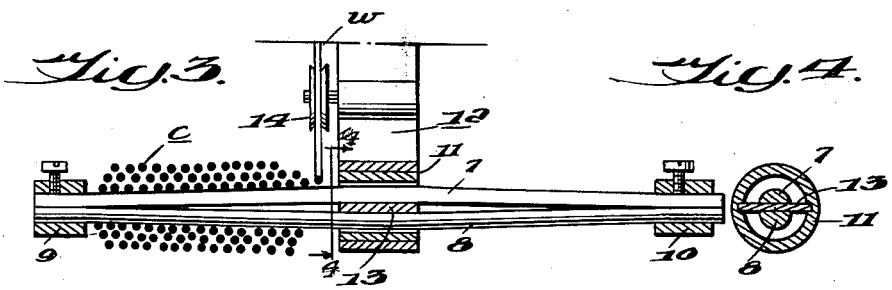
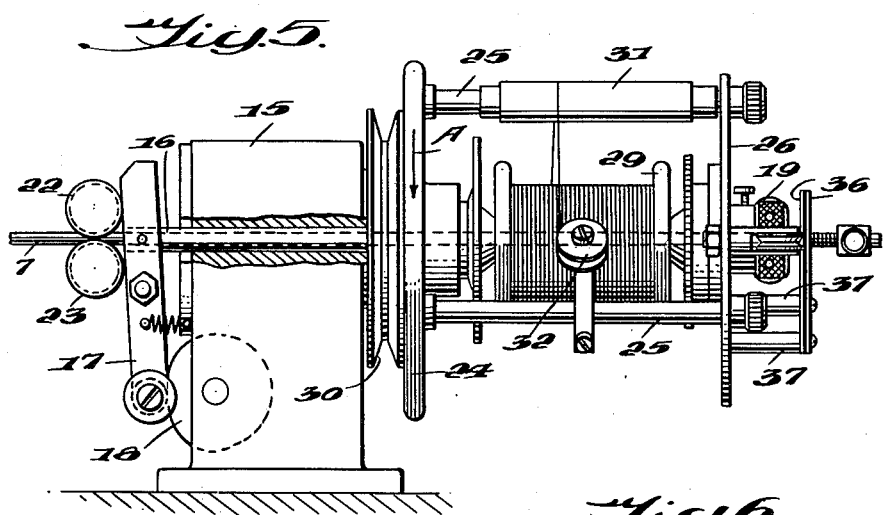
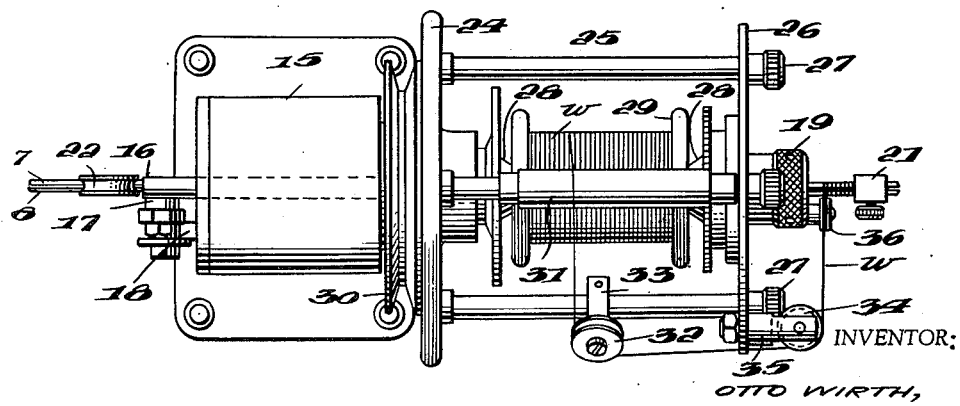

United States Patent Office 2,704,103
Patented Mar. 15, 1955

2,704,103

METHOD OF AND APPARATUS FOR MANUFACTURING CORELESS BANKED MULTILAYER COILS

Otto Wirth, Zurich, Switzerland, assignor to Micafil A.-G., Zurich-Alstetten, Switzerland Application July 16, 1954, Serial No. 443,930

Claims priority, application Switzerland June 28, 1949

7 Claims. (Cl. 153—67)

This invention relates to methods of and apparatus for manufacturing coreless banked multilayer coils for use in hollow ring shuttles of certain coil winding machines.

This application is a continuation-in-part of my copending application Serial No. 169,393, filed June 21, 1950, and issued January 18, 1955, as Patent No. 2,699,902, which describes and claims a machine for winding closed ring cores with wire stored within a hollow ring shuttle which is threaded through the closed core. As illustrated and described in that application, wires of larger size than about U. S. Gauge No. 32 (0.0095 inch or about 0.2 mm. diameter) may be stored in the hollow ring shuttle in the form of a loosely wound single layer helix seated on a conical boss upon which the helix rotates as a wire is drawn off and wrapped upon the closed core, whereas finer wire is stored within the hollow ring shuttle as a long and coreless banked multilayer coil which is self-supporting and from which the starting end is withdrawn through the center of the coil without rotating the same.

Objects of the present invention are to provide methods of and apparatus for manufacturing coreless banked multilayer coils for use in ring shuttles of core-winding machines. A further object is to provide a method of manufacturing long banked multilayer coils of small diameter which may be readily removed from the mandrels upon which they are wound. More specifically, an object is to provide a method of winding banked multilayer coils which comprises the steps of providing a mandrel formed of two rods of semi-circular cross-section, effecting relative rotation and relative longitudinal motion of the mandrel and a supply of wire to wind the wire in banked multilayer turns upon the mandrel, spreading the mandrel rods apart at the point of winding to prevent the wound wire from binding upon the mandrel, removing the spreader from between the mandrel rods upon completing the winding of the coil, and stripping the collapsed mandrel sections from within the completed coil.

These and other objects and the advantages of the invention will be apparent from the following specification when taken with the accompanying drawings in which:

Fig. 1 is a fragmentary vertical sectional view of a ring shuttle having therein a banked multilayer coil of the type contemplated by the invention;

Fig. 2 is a fragmentary sectional view, on a greatly enlarged scale, through the prewound coil of Fig. 1;

Fig. 3 is a somewhat schematic view, partly in section, of apparatus for manufacturing the coil;

Fig. 4 is a transverse section on line 4—4 of Fig. 3;

Fig. 5 is a fragmentary elevation of another form of apparatus for the manufacture of coils in accordance with the invention;

Fig. 6 is a plan view of the same; and

Figs. 7 and 8 are, respectively, a fragmentary plan and a horizontal section, on an enlarged scale, of the mandrel head and associated elements.

In Fig. 1 of the drawings, the reference numeral 1 identifies a radially split hollow ring shuttle having an arcuate coupling rod 2 fixed in one end thereof and notched to fit upon a latch pin 3 which extends transversely of the other end of the hollow ring 1. One end of a bank wound multilayer coil C of fine enamel insulated copper wire is seated upon the fixed end of the coupling rod 2, and the starting end S of the coil is drawn through the coil and the outlet passage 4 in the coupling rod. The wire then passes over a plurality of pins 5 which extend transversely of a slot 6 through the coupling rod 2, and is thereby straightened as it is withdrawn from the shuttle ring 1 and wound upon a toroidal or other closed core.

The form and method of winding of the banked multilayer coil C are shown schematically, but not to scale, in Fig. 2, as the relative oscillatory motion of the winding wire guide and the mandrel produces banked layers of wire with an angular displacement $\alpha$ having a maximum of about 20°. In apparatus as illustrated in Figs. 3 and 4, the coil C is wound upon a mandrel having an overall cross-section which is substantially circular and which comprises two rods 7, 8 of semi-circular cross-section. One set of ends of the mandrel rods is secured in a clamp 9 that is mounted on the spindle, not shown, of a machine such as employed for the winding of honeycomb coils, and the free ends of the rods 7, 8 are held in a clamp 10. The mandrel rods 7, 8 extend through a bushing 11 that is rotatably mounted in the wire guide assembly 12 of the coil winding machine, and said rods 7, 8 are located at opposite sides of a spreader member 13 which is fixed in and extends diametrically across the bushing 11. The wire guide assembly includes an idler guide wheel 14 over which wire $w$ is drawn from a spool, not shown, and wound into a coil C on the mandrel. The wire guide assembly performs two movements, a back and forth movement of about 3 millimeters and a progressive displacement axially of the mandrel from the beginning to the end of the latter.

It is to be noted that all dimensions in Fig. 3 are not to the same scale since, for clarity of illustration, the wire diameter and the transverse dimensions of the mandrel rods 7, 8 are greatly exaggerated as compared with the longitudinal dimension of the mandrel rods. For use in tubular shuttle rings of from 6 to 10 millimeters internal diameter, the external diameters of the wound coils should not exceed from 4.5 to 7.5 millimeters, and the normal diameter of the mandrel should of course be somewhat smaller, whereas the length of the mandrel may be about 90 centimeters for the winding of banked multilayer coils of a length of about 50 centimeters.

The coils may also be wound on a machine, as shown in Figs. 5–8, comprising a stand or head 15 in which a tubular member 16 is supported for reciprocation by a lever 17 and cam 18, but is restrained from rotary motion by means, not shown. A mandrel comprising mandrel rods 7, 8 of semi-circular cross-section extends through the tubular member 16 and a mandrel head 19 which is fixed to the end thereof remote from the stand 15 by a thumb screw 19'. The mandrel rods are arranged at opposite sides of diametrically arranged idler spreader wheels 20 which are mounted in the mandrel head 19, and the projecting ends of the mandrel rods are secured together by a clamp 21. The mandrel is moved through the tubular member at a uniform speed by feed rollers 22, 23 which, like the cam 18, are driven by a motor and gearing, not shown, supported on or within the stand 15.

A carriage is rotatably supported on the tubular member 16, the carriage comprising a support plate 24 on which rods 25 are mounted, and an end plate 26 which is secured to the rods by cap nuts 27. Hubs 28 are secured axially to the respective plates 24, 26 to support a spool 29 of fine wire $w$ for rotation with respect to the carriage and the tubular member 16 upon which, in turn, the carriage is rotatably supported. A pulley 30 is fixed to the support plate 24 and is driven by a belt and motor, not shown, to rotate the carriage in the direction of arrow A to wind the wire $w$ upon the mandrel 7, 8. As the wire is drawn from spool 29, it passes over a roller 31 journalled on one of the spacer rods 25, a guide pulley 32 on an arm 33 secured to another rod 25, a second guide pulley 34 on a stud 35 mounted on end plate 26, and then between guide strips 36.

The guide strips 36 are so spaced from the end plate 26 by posts 37 that the wire is wound upon the mandrel 7, 8 a short distance beyond the spreader wheels 20 at a point where the mandrel is spread to somewhat more than its normal or collapsed diameter.

The spreader wheels prevent rotation of the mandrel since they are mounted in the mandrel head 19 which is secured to the tubular member 16 by a thumb screw 19'.

On winding of the coil to a desired length, the machine is stopped, the mandrel is withdrawn from the tubular member 16 and mandrel head 19, the clamp 21 is removed from the mandrel, and the rods 7 and 8 are withdrawn one at a time from the wound coil. The starting end of the wire w is then fed through the center of the coil to project beyond the finish end, and the coil is ready for insertion in the ring shuttle of the core-winding machine. It is convenient to insert a rod of small diameter in the wound coil to guard against a collapse of the coil during transfer to and insertion in the ring shuttle.

I claim:

1. In the manufacture of a banked multilayer coil of fine wire, the process which comprises providing a mandrel of circular cross-section consisting of two mandrel rods of semicircular cross-section, producing relative rotation and relative longitudinal movement of said mandrel and a wire to wind the wire upon the mandrel as a banked multilayer winding, progressively spreading the mandrel rods apart at the winding point as it is displaced along the mandrel, thereby to enlarge the normal diameter of the mandrel, whereby the coil is relatively loose on the mandrel at the end of the winding operation, and withdrawing the mandrel rods one at a time from the wound coil.

2. In the manufacture of a banked multilayer coil of fine wire, the process as recited in claim 1, in combination with the step of withdrawing the starting end of the wound coil through the center thereof.

3. In the manufacture of a banked multilayer coil of fine wire, the process which comprises providing a mandrel of circular cross-section consisting of two mandrel rods of semicircular cross-section, producing relative rotation of the mandrel and a wire to wind the wire upon the mandrel, feeding the mandrel rectilinearly and simultaneously guiding the wire back and forth to form a banked multilayer winding, progressively spreading the mandrel rods apart at the winding point as it is displaced along the mandrel to enlarge the normal diameter of the mandrel, whereby the coil is relatively loose upon the mandrel at the end of the winding operation, and withdrawing the mandrel rods one at a time from the wound coil.

4. In the manufacture of a banked multilayer coil of fine wire, the process as recited in claim 2, wherein the relative rotation of the mandrel and a wire is effected by rotating the wire about the mandrel.

5. In apparatus for manufacturing a banked multilayer coil of fine wire, a mandrel comprising a pair of parallel rods, means clamping one set of ends of said rods together, a wire guide, means producing relative rotation of said rods and said wire guide to wind upon said rods a wire guided by said wire guide, means producing relative longitudinal movement of said mandrel and wire guide in overlapping steps to wind the wire on the mandrel as a banked multilayer winding, and means spreading the rods of said mandrel apart at the winding point to increase temporarily the effective cross-section of said mandrel.

6. In apparatus for manufacturing a banked multilayer coil of fine wire, a mandrel comprising a pair of parallel rods of semi-circular cross-section, means clamping both sets of ends of said rods together with their flat surfaces opposed to each other, a wire guide assembly including a guide for a wire to be wound on said mandrel and having a bushing rotatable in said assembly, a spreader bar extending diametrically across said bushing, said mandrel rods extending through said bushing at opposite sides of said spreader bar; said wire guide directing the wire to a point on said mandrel at which said mandrel rods are spread apart by said spreader bar.

7. In apparatus for manufacturing a banked multilayer coil of fine wire, a mandrel comprising a pair of parallel rods of semi-circular cross-section, a stand having a tube mounted therein for reciprocation, said tube being of a diameter for said mandrel to slide therein, a mandrel head fixed to one end of said tube and having idler wheels mounted thereon with the inner edges thereof extending between said mandrel rods, feed rollers for moving said mandrel rods through said tube and mandrel head at a uniform rate, means clamping together the ends of said mandrel rods beyond said mandrel head, a carriage rotatably supported on said tube, said carriage including means for rotatably supporting a spool of wire and means for guiding wire from said spool to a point on said mandrel between said mandrel head and said clamping means, and means imparting an oscillating linear motion to said tube and the carriage supported thereon, whereby the wire is wound upon the spread portion of said mandrel as a banked multilayer winding.

References Cited in the file of this patent

UNITED STATES PATENTS

| | | |
|---|---|---|
| 572,759 | Jamison | Dec. 8, 1896 |
| 674,078 | Cree | May 14, 1901 |
| 870,237 | Horsley | Nov. 5, 1907 |
| 1,264,355 | Wiegand | Apr. 30, 1918 |
| 1,600,258 | Van Veen | Sept. 21, 1926 |
| 1,964,221 | Schweiter | June 26, 1934 |
| 1,970,897 | Parks | Aug. 21, 1934 |
| 2,035,268 | Johnson | Mar. 24, 1936 |
| 2,125,759 | Weinacker | Aug. 2, 1938 |
| 2,164,679 | Braun | July 4, 1939 |

FOREIGN PATENTS

| | | |
|---|---|---|
| 399,573 | Great Britain | Oct. 12, 1933 |
| 288,014 | Switzerland | Apr. 16, 1953 |